(12) United States Patent
Lee et al.

(10) Patent No.: US 10,499,416 B2
(45) Date of Patent: Dec. 3, 2019

(54) DOWNLINK CHANNEL RATE MATCHING OF SYNCHRONIZATION SIGNAL BLOCK TRANSMISSIONS IN A NEW RADIO WIRELESS COMMUNICATION SYSTEM

(71) Applicant: QUALCOMM Incorporated, San Diego, CA (US)

(72) Inventors: Heechoon Lee, San Diego, CA (US); Tao Luo, San Diego, CA (US); Xiaoxia Zhang, San Diego, CA (US); Bilal Sadiq, Basking Ridge, NJ (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/865,733

(22) Filed: Jan. 9, 2018

(65) Prior Publication Data

US 2018/0199363 A1 Jul. 12, 2018

Related U.S. Application Data

(60) Provisional application No. 62/444,618, filed on Jan. 10, 2017.

(51) Int. Cl.
*H04W 72/12* (2009.01)
*H04W 56/00* (2009.01)
(Continued)

(52) U.S. Cl.
CPC ....... *H04W 72/1273* (2013.01); *H04L 5/0044* (2013.01); *H04L 5/0048* (2013.01);
(Continued)

(58) Field of Classification Search
CPC ....... H04L 1/00; H04L 1/1819; H04L 27/261; H04L 5/001; H04L 5/0023; H04L 5/0044;
(Continued)

(56) References Cited

U.S. PATENT DOCUMENTS 7,068,639 B1\* 6/2006 Varma ............... H04W 72/1263
370/347
2008/0273513 A1\* 11/2008 Montojo ............... H04L 1/1607
370/342

(Continued)

OTHER PUBLICATIONS

International Search Report and Written Opinion—PCT/US2018/013139—ISA/EPO—dated Jun. 14, 2018.
(Continued)

*Primary Examiner* — Dung B Huynh
(74) *Attorney, Agent, or Firm* — Arent Fox, LLP

(57) ABSTRACT

A configurable new radio (NR) resource scheduling and indication transmission procedure that may be executed by a base station and a user equipment (UE) is disclosed. For example, a base station may determine a number of synchronization signal blocks available for transmission of non-scheduling data, and transmit an indication signifying at least one of the number of synchronization signal blocks or a location of each of the number of synchronization signal blocks. Further, a UE may receiving an indication signifying at least one of a number of synchronization signal blocks or a location of each of the number of synchronization signal blocks. The UE may further determine one or more resource elements forming the number of synchronization signal blocks where non-scheduling data has been scheduled for transmission. The UE may receive the non-scheduling data within the one or more resource elements forming the number of synchronization signal blocks.

28 Claims, 6 Drawing Sheets

(51) Int. Cl.
*H04W 76/27* (2018.01)
*H04L 5/00* (2006.01)
*H04W 72/04* (2009.01)
*H04L 1/00* (2006.01)
*H04L 27/26* (2006.01)
*H04L 1/18* (2006.01)

(52) U.S. Cl.
CPC ....... *H04L 5/0094* (2013.01); *H04W 56/0005* (2013.01); *H04W 72/1205* (2013.01); *H04W 76/27* (2018.02); *H04L 1/00* (2013.01); *H04L 1/1819* (2013.01); *H04L 5/001* (2013.01); *H04L 5/0023* (2013.01); *H04L 5/0051* (2013.01); *H04L 5/0053* (2013.01); *H04L 27/261* (2013.01); *H04W 72/042* (2013.01)

(58) Field of Classification Search
CPC ... H04L 5/0048; H04L 5/0051; H04L 5/0053; H04L 5/0094; H04W 56/0005; H04W 72/042; H04W 72/1205; H04W 72/1273; H04W 76/27
See application file for complete search history.

(56) References Cited

U.S. PATENT DOCUMENTS

| | | | | |
|---|---|---|---|---|
| 2009/0262696 A1* | 10/2009 | Wei | H04L 5/0044 | 370/329 |
| 2009/0268680 A1* | 10/2009 | Nam | H04L 5/0092 | 370/329 |
| 2009/0323628 A1* | 12/2009 | Cho | H04L 5/0007 | 370/330 |
| 2010/0008314 A1* | 1/2010 | Maheshwari | H04W 72/044 | 370/329 |
| 2010/0128614 A1* | 5/2010 | Kuusela | H04L 47/781 | 370/252 |
| 2010/0195614 A1* | 8/2010 | Nimbalker | H04W 72/1289 | 370/330 |
| 2011/0007674 A1* | 1/2011 | Dai | H04L 1/1812 | 370/282 |
| 2011/0085506 A1* | 4/2011 | Lee | H04L 5/0023 | 370/329 |
| 2011/0190003 A1* | 8/2011 | Hiltunen | H04W 72/085 | 455/452.1 |
| 2011/0216689 A1* | 9/2011 | Jenkins | H04W 40/00 | 370/315 |
| 2011/0237283 A1* | 9/2011 | Shan | H04L 5/0091 | 455/509 |
| 2011/0249633 A1* | 10/2011 | Hong | H04L 5/0053 | 370/329 |
| 2012/0087323 A1* | 4/2012 | Feng | H04L 5/0005 | 370/329 |
| 2013/0107116 A1* | 5/2013 | Charbit | H04L 5/003 | 348/388.1 |
| 2013/0114525 A1* | 5/2013 | Ahmadi | H04L 5/0053 | 370/329 |
| 2013/0201975 A1* | 8/2013 | Chen | H04W 72/0446 | 370/336 |
| 2013/0229953 A1* | 9/2013 | Nam | H04W 72/0426 | 370/280 |
| 2013/0308504 A1* | 11/2013 | Nimbalker | H04L 5/001 | 370/281 |
| 2014/0140218 A1* | 5/2014 | Jamadagni | H04W 24/08 | 370/241.1 |
| 2014/0153524 A1* | 6/2014 | Xu | H04L 5/0044 | 370/329 |
| 2014/0220997 A1* | 8/2014 | Ezaki | H04L 5/0073 | 455/452.2 |
| 2014/0307644 A1* | 10/2014 | Kwong | H04L 5/0005 | 370/329 |
| 2014/0313985 A1* | 10/2014 | Nimbalker | H04L 27/0012 | 370/329 |
| 2015/0009939 A1* | 1/2015 | Zhang | H04W 72/1289 | 370/329 |
| 2015/0023289 A1* | 1/2015 | Tian | H04L 1/00 | 370/329 |
| 2015/0029974 A1* | 1/2015 | Yamazaki | H04W 72/04 | 370/329 |
| 2015/0036609 A1* | 2/2015 | Kim | H04W 56/00 | 370/329 |
| 2015/0124671 A1* | 5/2015 | Tabet | H04W 52/0216 | 370/311 |
| 2015/0181588 A1* | 6/2015 | Song | H04L 1/1607 | 370/280 |
| 2016/0007357 A1* | 1/2016 | Yano | H04L 1/00 | 370/329 |
| 2016/0255581 A1* | 9/2016 | Aydin | H04W 52/0206 | 370/311 |
| 2016/0316491 A1* | 10/2016 | Axmon | H04W 74/0833 | |
| 2017/0142604 A1* | 5/2017 | Reial | H04L 5/0094 | |
| 2017/0195942 A1* | 7/2017 | Zhao | H04W 48/12 | |
| 2017/0201340 A1* | 7/2017 | Yum | H04J 13/0048 | |
| 2017/0201968 A1* | 7/2017 | Nam | H04W 4/70 | |
| 2017/0238272 A1* | 8/2017 | You | H04J 11/0073 | 370/350 |
| 2017/0245313 A1* | 8/2017 | Kim | H04L 1/1671 | |
| 2017/0289818 A1* | 10/2017 | Ng | H04W 48/12 | |
| 2017/0310429 A1* | 10/2017 | Wang | H04L 1/1854 | |
| 2017/0331670 A1* | 11/2017 | Parkvall | H04W 52/0274 | |
| 2018/0027544 A1* | 1/2018 | Kimura | H04J 11/00 | 370/330 |
| 2018/0035416 A1* | 2/2018 | Yi | H04L 5/0037 | |
| 2018/0084561 A1* | 3/2018 | Liu | H04L 1/00 | |
| 2018/0084593 A1* | 3/2018 | Chen | H04W 76/11 | |
| 2018/0123849 A1* | 5/2018 | Si | H04J 11/0073 | |
| 2018/0132168 A1* | 5/2018 | Ingale | H04W 48/12 | |
| 2018/0139011 A1* | 5/2018 | Chae | H04B 7/26 | |
| 2018/0145818 A1* | 5/2018 | Choi | H04L 5/0007 | |
| 2018/0167959 A1* | 6/2018 | Liao | H04L 5/00 | |
| 2018/0176912 A1* | 6/2018 | Li | H04W 72/04 | |
| 2018/0176946 A1* | 6/2018 | Sun | H04L 5/0048 | |
| 2018/0183551 A1* | 6/2018 | Chou | H04L 5/0042 | |
| 2018/0198659 A1* | 7/2018 | Ko | H04L 5/005 | |
| 2018/0248642 A1* | 8/2018 | Si | H04L 5/0053 | |
| 2018/0254874 A1* | 9/2018 | Wang | H04L 5/0053 | |
| 2018/0317241 A1* | 11/2018 | Xia | H04W 72/042 | |
| 2018/0343611 A1* | 11/2018 | Jiao | H04W 16/10 | |
| 2018/0376500 A1* | 12/2018 | Yang | H04W 72/12 | |
| 2019/0007181 A1* | 1/2019 | Marinier | H04L 5/0007 | |

OTHER PUBLICATIONS

LG Electronics: "Discussion on Synchronization Channel Design for NB-IoT", 3GPP Draft; R1-155798, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 4, 2015, XP051039756, 4 pages, Retrieved from the Internet: URL:http://www.3gpp.org/ftp/Meetings_3GPPSYNC/RAN1/Docs/ [retrieved on Oct. 4, 2015].

LG Electronics: "Synchronization Signal Design for NB-IoT," 3GPP Draft; R1-161120, 3rd Generation Partnership Project (3GPP), Mobile Competence Centre; 650, Route Des Lucioles; Sophia-Antipolis Cedex; France, vol. RAN WG 1, No. St. Julian's, Malta; Feb. 14, 2016, XP051054420, 7 pages, Retrieved from the Internet: URL: http://www.3gpp.org/ftp/Meetings_3GPPSYNC/RAN1/Docs/ [retrieved on Feb. 14, 2016].

Partial International Search Report—PCT/US2018/013139—ISA/EPO—dated Apr. 20, 2018.

WI Rapporteur (Ericsson): "RAN1 Agreements for Rel-13 NBIoT", 3GPP Draft; R1-161548, 3rd Generation Partnership Project (3GPP), Mobile Competence Centre; 650, Route Des Lucioles; F-06921 Sophia-Antipolis Cedex; France, vol. RAN WG 1, No. St. Julian's, Malta; Mar. 2, 2016, XP051079462, 11 pages, Retrieved from the Internet: URL: http://www.3gpp.org/ftp/tsg_ran/WG1_RL1/TSGR1_84/Docs/ [retrieved on Mar. 2, 2016].

ZTE Microelectronics: "Considerations on SS Block Design", 3GPP Draft; R1-1611268, 3rd Generation Partnership Project (3GPP),

(56) References Cited

OTHER PUBLICATIONS

Mobile Competence Centre; 650, Route Des Lucioles; F-06921 Sophia-Antipolis Cedex; France, vol. RAN WG1, No. Reno, USA; Nov. 13, 2016, XP051175249, 7 pages, Retrieved from the Internet: URL:http://www.3gpp.org/ftp/Meetings_3GPPSYNC/RAN1/Docs/ [retrieved on Nov. 13, 2016].

* cited by examiner

DOWNLINK CHANNEL RATE MATCHING OF SYNCHRONIZATION SIGNAL BLOCK TRANSMISSIONS IN A NEW RADIO WIRELESS COMMUNICATION SYSTEM

CROSS-REFERENCE TO RELATED APPLICATION(S)

This application claims the benefit of U.S. Provisional Application Ser. No. 62/444,618, entitled "DOWNLINK CHANNEL RATE MATCHING OF SYNCHRONIZATION SIGNAL BLOCK TRANSMISSIONS IN A NEW RADIO WIRELESS COMMUNICATION SYSTEM" and filed on Jan. 10, 2017, which is expressly incorporated by reference herein in its entirety.

BACKGROUND

Aspects of the present disclosure relate generally to wireless communication networks, and more particularly, to a downlink channel rate matching of synchronization signal block transmission in a new radio (NR) wireless communication system.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, conventional downlink channel rate matching solutions may not provide a desired level of speed or customization for efficient network operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method for wireless communications at a network entity. The method may include determining a number of synchronization signal blocks available for transmission of non-scheduling data. The method may further include transmitting, on a downlink channel, an indication signifying at least one of the number of synchronization signal blocks or a location of each of the number of synchronization signal blocks.

In another aspect, a network entity comprises a memory and at least one processor in communication with the memory. The at least one processor may be configured to determine a number of synchronization signal blocks available for transmission of non-scheduling data. The at least one processor may further be configured to transmit, on a downlink channel, an indication signifying at least one of the number of synchronization signal blocks or a location of each of the number of synchronization signal blocks.

In an additional aspect, a network entity for wireless communications may include means for determining a number of synchronization signal blocks available for transmission of non-scheduling data. The network entity may further include means for transmitting, on a downlink channel, an indication signifying at least one of the number of synchronization signal blocks or a location of each of the number of synchronization signal blocks.

In yet another aspect, a computer-readable medium storing computer code executable by a processor for wireless communications at a network entity may include code for determining a number of synchronization signal blocks available for transmission of non-scheduling data. The computer-readable medium may further include code for transmitting, on a downlink channel, an indication signifying at least one of the number of synchronization signal blocks or a location of each of the number of synchronization signal blocks.

In an aspect, the present disclosure includes a method for wireless communications at a user equipment (UE). The method may include receiving, on a downlink channel, an indication signifying at least one of a number of synchronization signal blocks or a location of each of the number of synchronization signal blocks. The method may further include determining one or more resource elements forming the number of synchronization signal blocks where non-scheduling data has been scheduled for transmission in response to receiving the indication signifying at least one of the location of the number of synchronization signal blocks or the number of synchronization signal blocks. Moreover, the method may include receiving the non-scheduling data within the one or more resource elements forming the number of synchronization signal blocks.

In another aspect, a UE comprises a memory and at least one processor in communication with the memory. The at least one processor may be configured to receive, on a downlink channel, an indication signifying at least one of a number of synchronization signal blocks or a location of each of the number of synchronization signal blocks. The at least one processor may further be configured to determine one or more resource elements forming the number of synchronization signal blocks where non-scheduling data has been scheduled for transmission in response to receiving the indication signifying at least one of the location of the number of synchronization signal blocks or the number of synchronization signal blocks. The at least one processor may further be configured to receive the non-scheduling data within the one or more resource elements forming the number of synchronization signal blocks.

In an additional aspect, a UE may include means for receiving, on a downlink channel, an indication signifying at least one of a number of synchronization signal blocks or a location of each of the number of synchronization signal blocks. The UE may further include means for determining one or more resource elements forming the number of synchronization signal blocks where non-scheduling data has been scheduled for transmission in response to receiving the indication signifying at least one of the location of the number of synchronization signal blocks or the number of synchronization signal blocks. The UE may further include means for receiving the non-scheduling data within the one or more resource elements forming the number of synchronization signal blocks.

In yet another aspect, a computer-readable medium storing computer code executable by a processor for wireless communications at a UE may include code for receiving, on a downlink channel, an indication signifying at least one of a number of synchronization signal blocks or a location of each of the number of synchronization signal blocks. The computer-readable medium may further include code for determining one or more resource elements forming the number of synchronization signal blocks where non-scheduling data has been scheduled for transmission in response to receiving the indication signifying at least one of the location of the number of synchronization signal blocks or the number of synchronization signal blocks. The computer-readable medium may further include code for receiving the non-scheduling data within the one or more resource elements forming the number of synchronization signal blocks.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
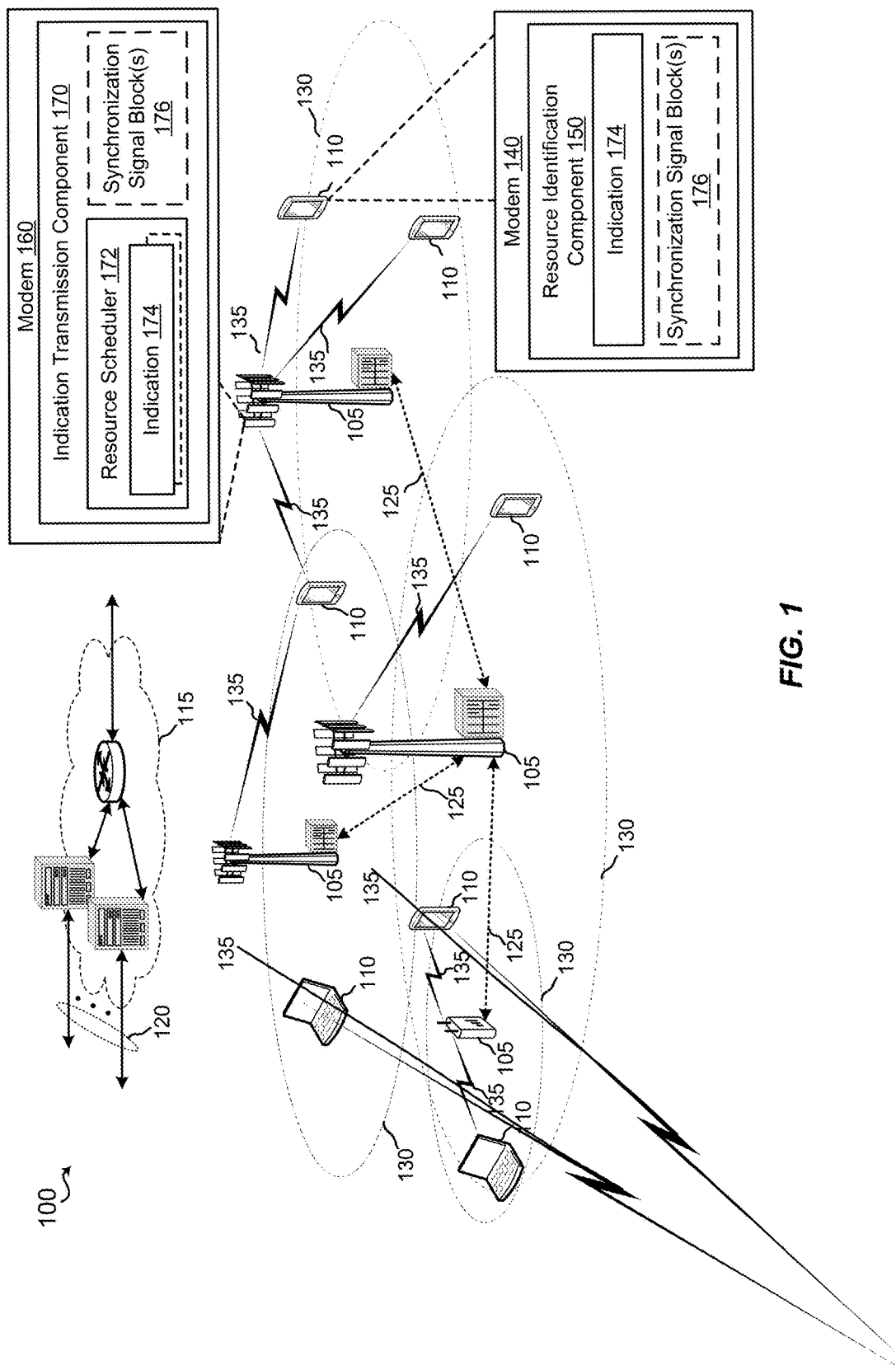
FIG. 1 is a schematic diagram of a wireless communication network including at least one network entity (e.g., a base station) having an indication transmission component configured to transmit an indication signifying a number of synchronization signal blocks and at least one user equipment (UE) having a resource identification component configured to determine one or more resource elements forming the number of synchronization signal blocks.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to downlink channel rate matching of synchronization signal block transmission in a new radio wireless communication system. For example, a network (e.g., a network entity such as a base station) may periodically transmit synchronization signal block(s) to user equipments (UEs) to support or otherwise enable one or more communication procedures such as, but not limited to, time and/or frequency synchronizations and/or cell identifier/identification detection. Further, broadcast information may also be periodically transmitted on a physical broadcast channel (PBCH) to provide the UE with system information (e.g., master information block (MIB)) for obtaining minimum system information delivered or transmitted by, for example, a physical downlink control channel (PDCCH) and/or a physical downlink shared channel (PDSCH). Additionally, in a new radio (NR) wireless communication system, an air interface may target a unified synchronization/PBCH design for single-beam and/or multi-beam configurations.

To accommodate single-beam and/or multi-beam configuration for synchronization and/or PBCH in an NR wireless communication system, a synchronization signal block may be transmitted per beam and retransmission including a redundancy version (e.g., as part of packet retransmissions such as a hybrid automatic repeat request (HARQ)). For example, in such systems, beam sweeping may be used to cover wide areas with narrow beams. In some aspects, the single-beam or multi-beam forming may configure the phase of each antenna to achieve constructive superposition of transmitted/received signals. In addition, redundancy version retransmission may be used to extend a link budget (e.g., accounting of all of the gains and losses from the transmitter, through the medium to the receiver in the new radio communication system). In some aspects related to LTE, at least four redundancy versions may be provided. In some aspects, the redundancy version may inform a device of an amount of redundancy added into a codeword for encoding. Further, the number of beams may be specific to network implementations.

However, in some aspects, the network may not utilize all potential synchronization signal block locations due to a finite number of beams available at the base station. Further, for instance, the network may not use certain synchronization signal block locations to avoid conflict with at least one downlink and/or uplink control region. As such, to efficiently utilize the available resources on the downlink, the network may multiplex one or more synchronization signal blocks with a downlink channel (e.g., PDSCH) and/or utilize unused or available resource elements from or corresponding to at least one synchronization block for data transmissions (e.g., on PDSCH).

Specifically, in an aspect, the present aspects may provide PDSCH rate matching with respect to synchronization signal block transmissions using or as part of downlink control indicator/information (DCI). For example, the network may determine whether to utilize unused or available resource elements from at least one synchronization signal block for data transmission on PDSCH. In another example, the present aspects may provide PDCCH rate matching and/or control resource transmissions with respect to synchronization signal block transmissions. In particular, the network may determine whether to utilize resource elements from at least one synchronization signal block for data transmission on a downlink control region (e.g., PDCCH). The network may, based on a determination to utilize the unused or available resource elements, transmit an indication corresponding to or otherwise including DCI to a UE to indicate the resource elements forming the synchronization signal blocks including non-scheduling data, thereby providing rate-matching.

Further, in some aspects related to transmissions on PDSCH, the DCI may have a current slot rate matching and/or a future slot rate matching in the case of slot aggregation and/or power saving mode. In some aspects related to transmissions on PDCCH, DCI may have future slots rate matching for PDCCH and high layer signaling may indicate PDCCH rate matching and the skipping/omission of control resources.

Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a resource identification component 150 that determines one or more resource elements forming the number of synchronization signal blocks 176 where non-scheduling data has been scheduled for transmission. Further, the wireless communication network 100 includes at least one base station 105 with a modem 160 having an indication transmission component 170 that transmits an indication 174 (e.g., DCI) signifying a location and/or a number of synchronization signal blocks 176 to the UE 110. Thus, according to the present disclosure, the base station 105 may determine and utilize unused or available resource elements forming or corresponding to synchronization signal blocks for transmission of non-scheduled data. To facilitate rate matching, however, the base station, and more specifically, the indication transmission component 170 may, via a resource scheduler 172, configure the indication 174 to indicate the location and/or the number of synchronization signal blocks 176 utilized for data (e.g., non-scheduling) transmission. In some aspects, the indication 174 may correspond to or otherwise be included in the DCI, which the resource scheduler 172 may configure dynamically as the number of synchronization signal blocks 176 per transmission varies. For example, the number of synchronization signal blocks 176 may be one of a single synchronization block, two or more consecutive synchronization blocks, or two or more non-consecutive synchronization signal blocks. Further, in aspects where the number of synchronization signal blocks 176 is indicated within or as part of the DCI (compared to when resources of non-synchronization signal blocks are scheduled and indicated in the DCI), various DCI fields may be configured such that the UE 110 may determine the number of synchronization signal blocks 176 based on the DCI fields. Further, in some aspects, the number of synchronization signal blocks 176 may be configured by or at the radio resource control (RRC) layer and transmitted semi-statically to the UE 110. In turn, the UE 110, and more specifically, the resource identification component 150 may be configured to receive the indication 174 from the base station 105 to determine the number of synchronization signal blocks 176 utilized by the base station 105 for transmission on a downlink channel (e.g., PDSCH or PDCCH). The UE 110 may then receive the non-scheduling data on the resource elements initially allocated for synchronization signaling, but used by the base station 105 for transmission of the non-scheduling data.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
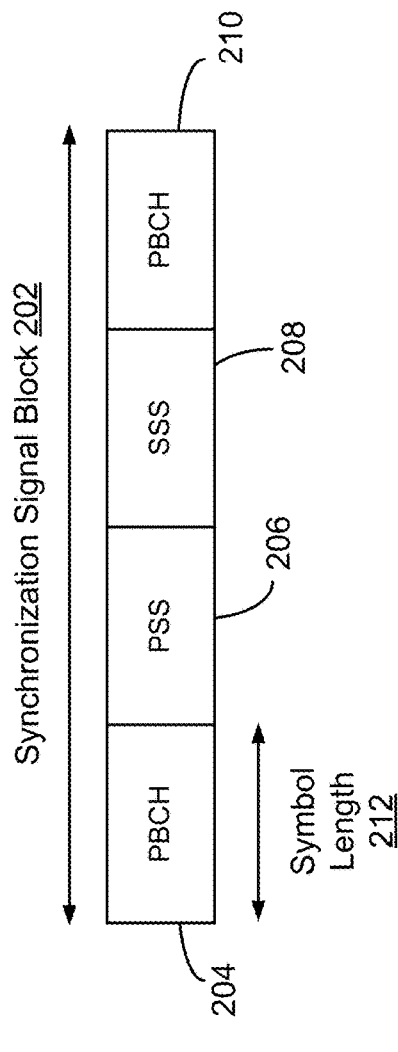
FIG. 2 is a conceptual diagram of an example synchronization signal block.

Referring to FIG. 2, a conceptual diagram 200 of an example synchronization signal block 202. The structure of the synchronization signal block 202 may apply to or otherwise form the number of synchronization signal blocks 176 (FIG. 1). Specifically, the synchronization signal block 202 may be of a unified structure incorporating or including one or more distinct synchronization signals. For example, the synchronization signal block 202 may be four symbols in length, with a symbol length 212 representing a single symbol forming the synchronization signal block 202. In some aspects, the synchronization signal block 202 may include two symbols for physical broadcast channel (PBCH) information 204 and 210, one symbol for a primary synchronization signal (PSS) 206 (e.g., to enable subframe level synchronization), and the secondary synchronization signal (SSS) 208 (e.g., used to obtain cell identity). The PBCH information 204 and 210 may carry or include data corresponding to a master information block (MIB). The PBCH information 204 and 210 may be transmitted on a PBCH, which may, in some aspects, broadcast various access parameters. Further, in some aspects, the PSS 206 and SSS 208 may each be a physical layer indication used for radio frame synchronization.

Further, demodulation resources for PBCH may be included as part of the PBCHs 204 and 210. As such, a single set of PSS 206, SSS 208, PBCHs 204 and 210 may form the synchronization signal block 202. In some aspects, the synchronization signal block 202 may be transmitted per beam and/or redundancy version. In some aspects, synchronization signal block 202 may also include reference signal measurements (e.g., reference signal received power (RSRP) and/or reference signal received quality (RSRQ) for beam-specific measurements in place of, or in addition to, PBCHs 204 and/or 210.

Figure 3:
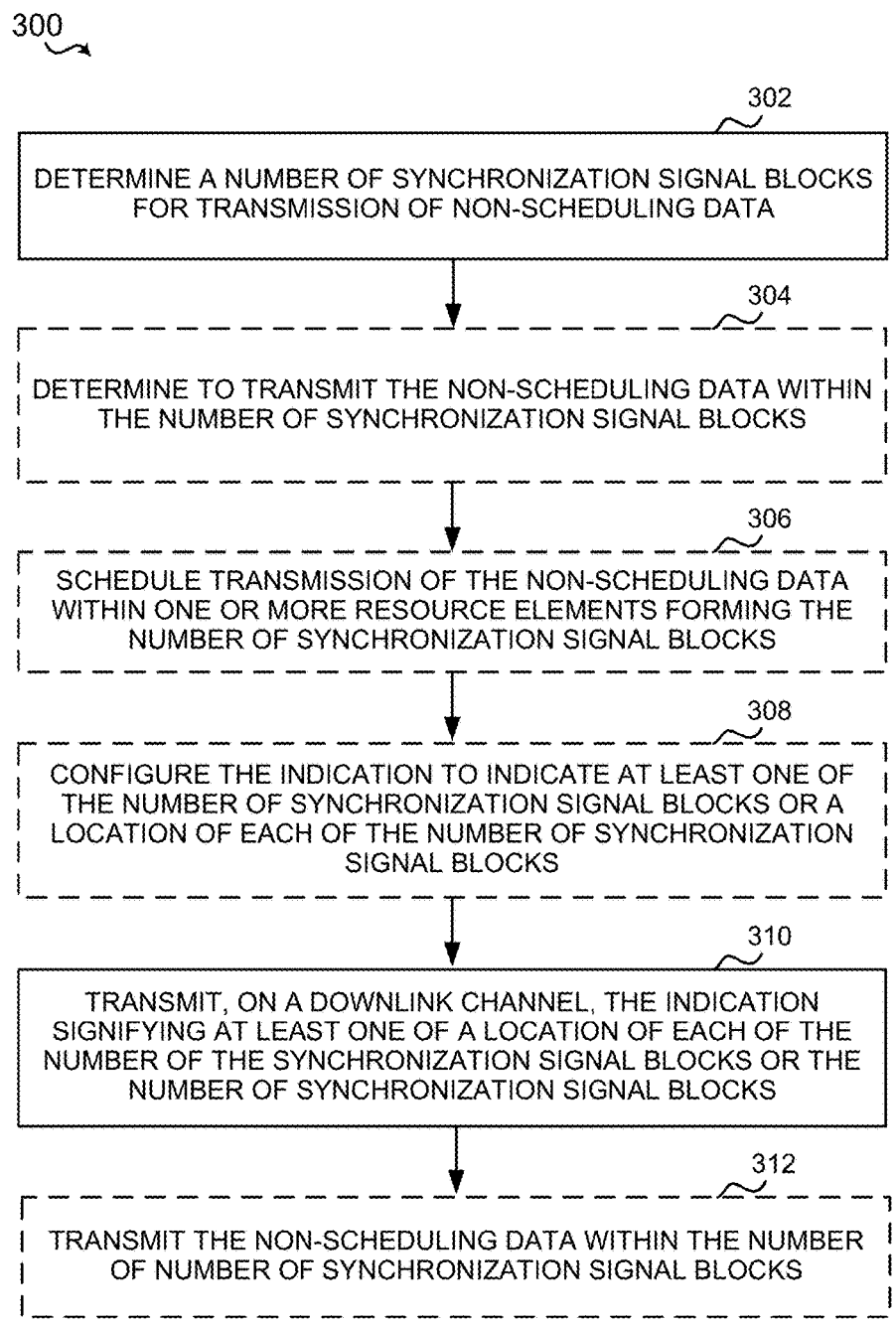
FIG. 3 is a flow diagram of an example of a method of wireless communication at a network entity.

Referring to FIG. 3, for example, a method 300 of wireless communication in operating a network entity such as base station 105 (e.g., gNodeB) according to the above-described aspects to provide rate matching on a downlink channel for synchronization signal block transmission in a new radio environment includes one or more of the herein-defined actions. The blocks illustrated as having dashed lines may be optional.

At block 302, the method 300 may determine a number of synchronization signal blocks available for transmission of non-scheduling data. For example, in an aspect, the base station 105 may execute the indication transmission component 170 to determine a number of synchronization signal blocks 176 available for transmission of non-scheduling data to the UE 110.

In some aspects, the number of synchronization signal blocks may be determined at the RRC layer. Further, in some aspects, the number the number of synchronization signal blocks 176 may correspond to at least one of a single synchronization signal block, two or more consecutive synchronization signal blocks, or two or more non-consecutive synchronization signal blocks. Additionally, in some aspects, determining the number of synchronization signal blocks 176 available for transmission of non-scheduling data includes determining that one or more resource elements forming the number of synchronization signal blocks 176 are available for transmission.

At block 304, the method 300 may determine to transmit the non-scheduling data within the number of synchronization signal blocks. For example, in an aspect, the base station 105 may execute the indication transmission component 170 to determine whether to transmit the non-scheduling data within one or more resource elements forming the number of synchronization signal blocks 176 based on a determination that the number of synchronization signal blocks 176 available for transmission of non-scheduling data.

At block 306, the method 300 may schedule transmission of the non-scheduling data within one or more resource elements forming the number of synchronization signal blocks. For example, in an aspect, the base station 105 may execute the indication transmission component 170 and execute the resource scheduler 172 to schedule transmission of the non-scheduling data within one or more resource elements forming the number of synchronization signal blocks 176. In some aspects, the one or more resource elements are each associated with a corresponding location within a transmission slot and/or a subframe (or frame structure) formed of one or more symbols. That is, the location of each of the number of synchronization signal blocks 176 may correspond to a symbol location within a frame or subframe transmission structure.

At block 308, the method 300 may configure an indication to indicate at least one of the number of synchronization signal blocks or a location of each of the number of synchronization signal blocks. For example, in an aspect, the base station 105 and/or the indication transmission component 170 may execute the resource scheduler 172 to configure an indication 174 to indicate or otherwise include at least one of the number of synchronization signal blocks 176 or a location of each of the number of synchronization signal blocks 176. In some aspects, the indication 174 may correspond to DCI.

At block 310, the method 300 may transmit, on a downlink channel, an indication signifying the number of synchronization signal blocks or the location of each of the number of synchronization signal blocks. For example, in an aspect, the base station 105 may execute transceiver 602 (FIG. 6) to transmit, on a downlink channel to the UE 110, the indication 174 signifying the number of synchronization signal blocks 176 or the location of each of the number of synchronization signal blocks 176. In some aspects, the downlink channel may correspond to PDSCH or PDCCH. In some aspects, the transmission may correspond to demodulation reference signal (DMRS) for PDSCH or control reference signal (RS) for PDCCH.

At block 312, the method 300 may transmit the non-scheduling data within the number of synchronization signal blocks. For example, in an aspect, the base station 105 may execute the transceiver 602 to transmit the non-scheduling data within the number of synchronization signal blocks 176 to the UE 110 following transmission of the indication 174 signifying the number of synchronization signal blocks 176. In some aspects, a portion of the non-scheduling data may be transmitted across unused resource elements corresponding to the number of synchronization signal block 176 and/or other data regions.

Figure 4:
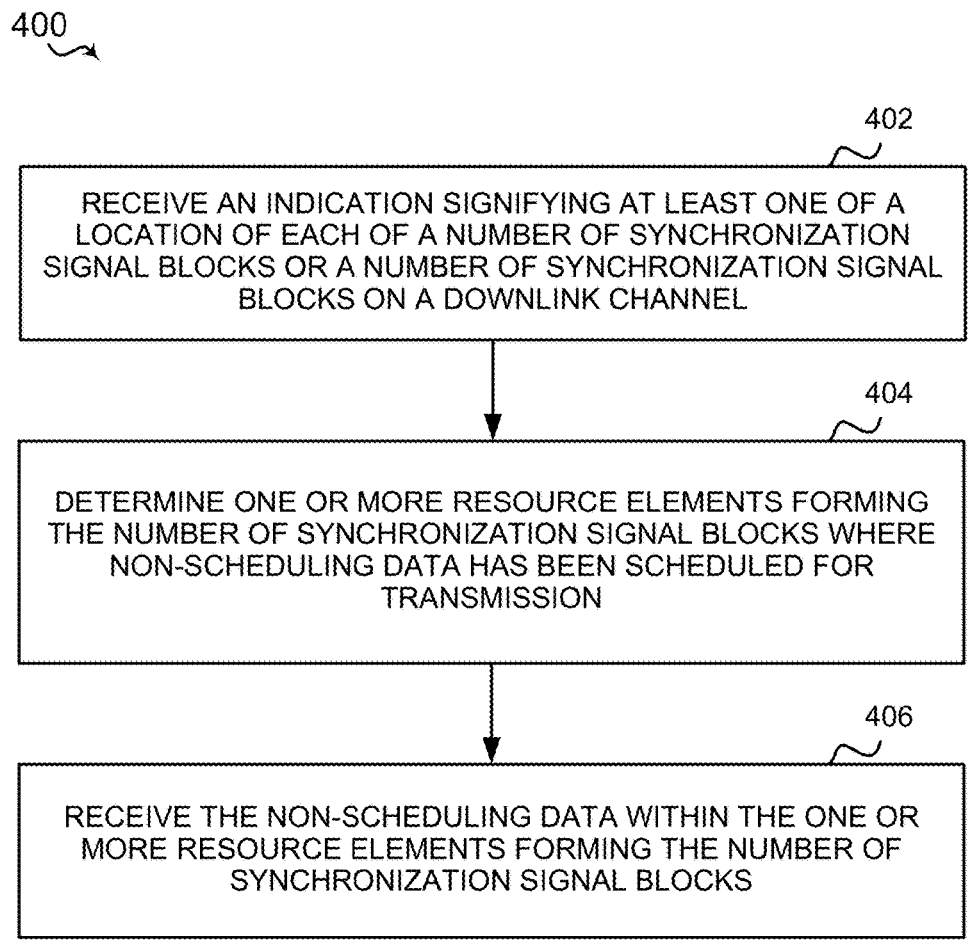
FIG. 4 is a flow diagram of an example of a method of wireless communication at a UE.

Referring to FIG. 4, for example, a method 400 of wireless communication in operating UE 110 according to the above-described aspects to identify resource elements forming synchronization blocks that are scheduled for data transmission includes one or more of the herein-defined actions. The blocks illustrated as having dashed lines may be optional.

At block 402, the method 400 may receive an indication signifying at least one of a number of synchronization signal blocks or a location of each of the number of synchronization signal blocks on a downlink channel. For example, the UE 110 may execute a transceiver 1202 (FIG. 5) to receive, on a downlink channel, an indication 174 signifying at least one of the number of synchronization signal blocks 176 or a location of each of the number of synchronization signal blocks 176. In some aspects, the indication 174 may be or correspond to DCI. Additionally, in some aspects, the downlink channel may correspond to PDSCH or PDCCH. In some aspects, the transmission may correspond to DMRS for PDSCH or control RS for PDCCH. Further, in some aspects, the number of synchronization signal blocks may be configured at an RRC layer.

At block 404, the method 400 may determine one or more resource elements forming the number of synchronization signal blocks where non-scheduling data has been scheduled for transmission. For example, the UE 110 may execute the resource identification component 150 to determine one or more resource elements forming the number of synchronization signal blocks 176 where non-scheduling data has been scheduled for transmission in response to receiving the indication 174 signifying at least one of the number of synchronization signal blocks 176 or a location of each of the number of synchronization signal blocks 176.

At block 406, the method 400 may receive the non-scheduling data within the one or more resource elements forming the number of synchronization signal blocks. For example, the UE 110 may execute the transceiver 1202 to receive the non-scheduling data within the one or more resource elements forming the number of synchronization signal blocks 176.

Figure 5:
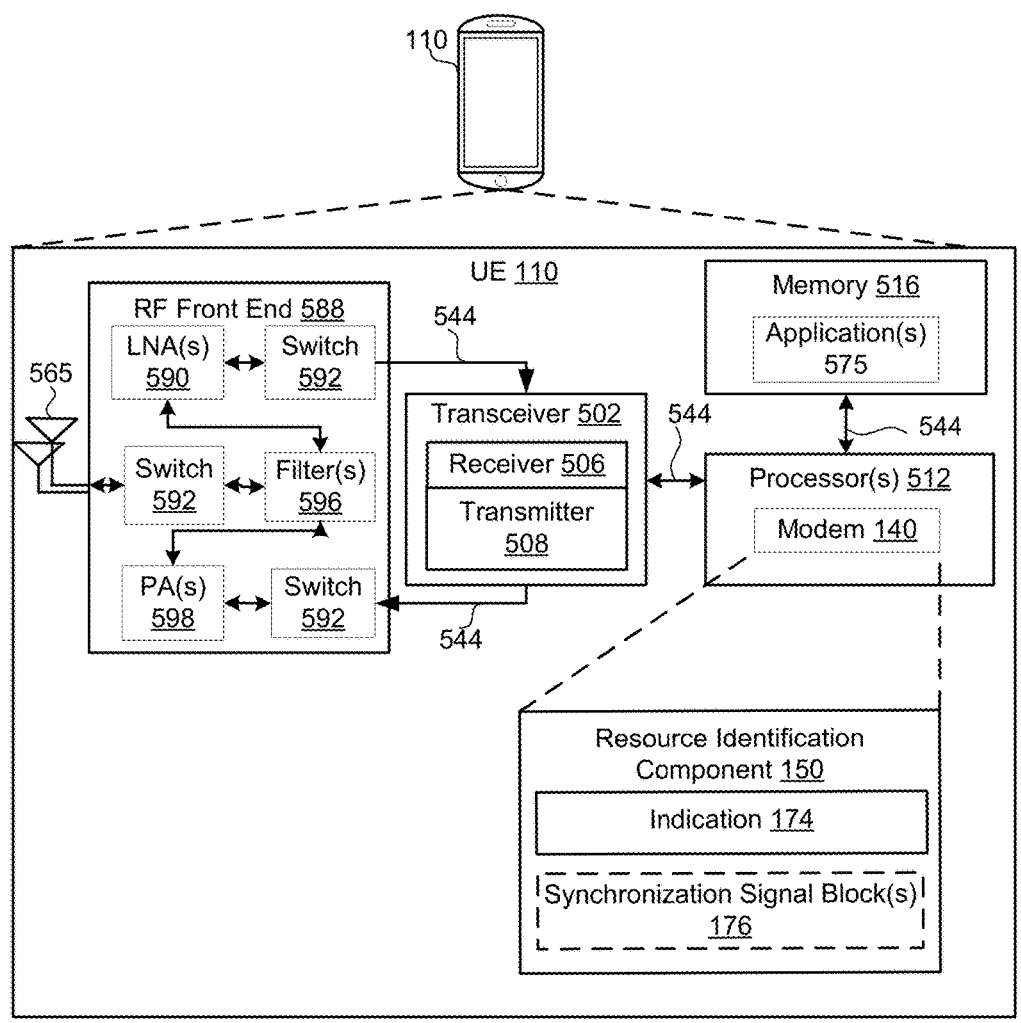
FIG. 5 is a schematic diagram of example components of the UE of FIG. 1.

Referring to FIG. 5, one example of an implementation of UE 110 may include a variety of components, some of which have already been described above, but including components such as one or more processors 512 and memory 516 and transceiver 502 in communication via one or more buses 544, which may operate in conjunction with modem 140 and resource identification component 150 to enable one or more of the functions described herein related to determining one or more resource elements forming the number of synchronization signal blocks 176 where non-scheduling data has been scheduled for transmission. Further, the one or more processors 1212, modem 514, memory 516, transceiver 502, radio frequency (RF) front end 588 and one or more antennas 565, may be configured to support voice and/or data calls (simultaneously or non-simultaneously) in one or more radio access technologies. In some aspects, the modem 514 may be the same as or similar to the modem 140.

In an aspect, the one or more processors 512 can include a modem 514 that uses one or more modem processors. The various functions related to resource identification component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with resource identification component 150 may be performed by transceiver 502.

Also, memory 516 may be configured to store data used herein and/or local versions of applications 575 or resource identification component 150 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining resource identification component 150 and/or one or more of its subcomponents, and/or data associated therewith, when UE 110 is operating at least one processor 512 to execute resource identification component 150 and/or one or more of its subcomponents.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a RF receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may include, but is not limited to, an RF transmitter.

Moreover, in an aspect, UE 110 may include RF front end 588, which may operate in communication with one or more antennas 565 and transceiver 502 for receiving and transmitting radio transmissions, for example, wireless communications transmitted by at least one base station 105 or wireless transmissions transmitted by UE 110. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and a corresponding specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 502 to operate at a specified frequency and power level based on the UE configuration of the UE 110 and the communication protocol used by modem 140.

In an aspect, modem 140 can be a multiband-multimode modem, which can process digital data and communicate with transceiver 502 such that the digital data is sent and received using transceiver 502. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1288, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 6:
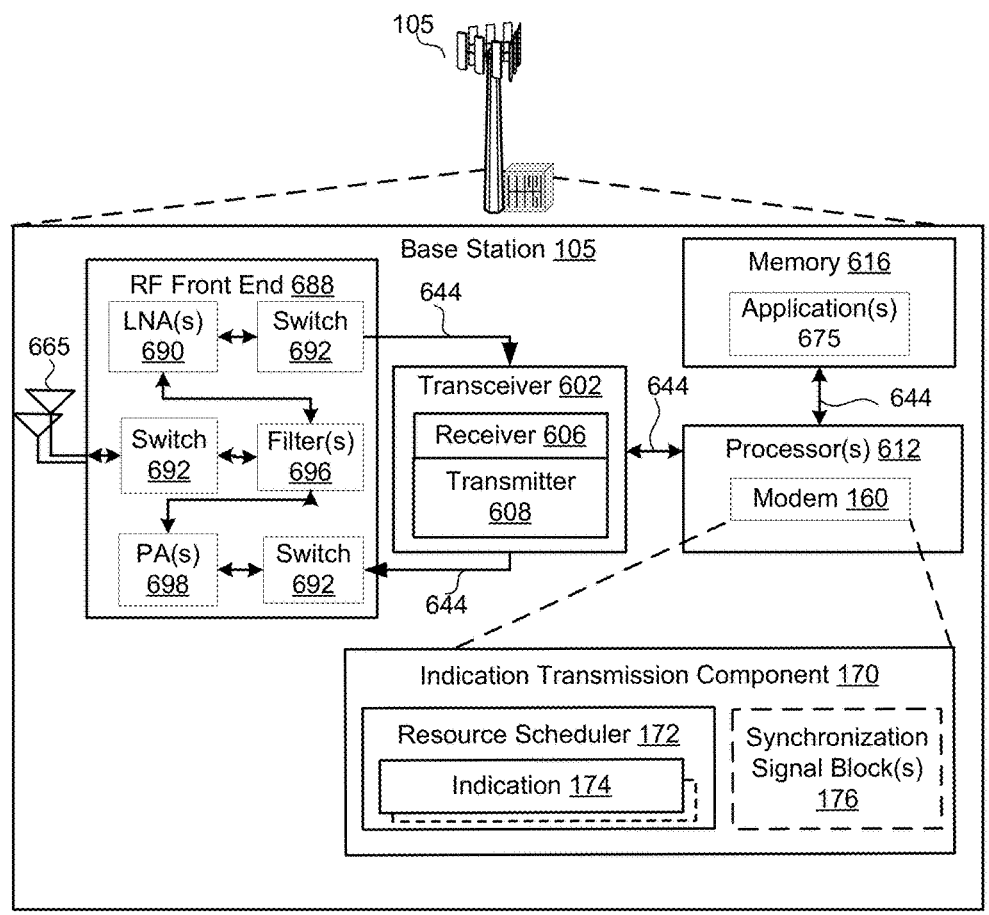
FIG. 6 is a schematic diagram of example components of the base station of FIG. 1.

Referring to FIG. 6, one example of an implementation of base station 105 may include a variety of components, some of which have already been described above, but including components such as one or more processors 612, a memory 616, and a transceiver 602 in communication via one or more buses 644, which may operate in conjunction with modem 160 and indication transmission component 170 including resource scheduler 172 to enable one or more of the functions described herein relating to rate matching on a downlink channel for synchronization signal block transmission in a new radio environment by, for example, transmitting an indication 174 signifying a number of synchronization signal blocks 176.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a network entity, comprising:
    identifying a number of synchronization signal blocks available for transmission of non-scheduling data;
    determining whether to transmit the non-scheduling data within the number of synchronization signal blocks;
    scheduling transmission of the non-scheduling data within one or more resource elements forming the number of synchronization signal blocks based on determining to transmit the non-scheduling data within the number of synchronization signal blocks;
    configuring an indication to signify the number of synchronization signal blocks; and
    transmitting, on a downlink channel, the indication signifying at least one of the number of synchronization signal blocks or a location of each of the number of synchronization signal blocks.

2. The method of claim 1, wherein the indication corresponds to downlink control information (DCI).

3. The method of claim 1, wherein the number of synchronization signal blocks is determined at a radio resource control (RRC) layer.

4. The method of claim 1, wherein the downlink channel corresponds to one of a physical downlink shared channel (PDSCH) or a physical downlink control channel (PDCCH).

5. The method of claim 1, wherein the number of synchronization signal blocks corresponds to at least one of:
    a single synchronization signal block,
    two or more consecutive synchronization signal blocks, or
    two or more non-consecutive synchronization signal blocks.

6. The method of claim 1, wherein determining at least one of the number of synchronization signal blocks or the location of each of the number of synchronization signal blocks includes determining that one or more resource elements forming the number of synchronization signal blocks are available for transmission.

7. The method of claim 1, further comprising transmitting the non-scheduling data within the number of synchronization signal blocks following transmission of the indication signifying the number of synchronization signal blocks.

8. The method of claim 1, wherein each of the number of synchronization signal blocks is at least four symbols in length.

9. The method of claim 1, wherein the network entity corresponds to an gNodeB.

10. A method of wireless communications at a user equipment (UE), comprising:
    receiving, on a downlink channel, an indication signifying at least one of a number of synchronization signal blocks or a location of each of the number of synchronization signal blocks;
    determining one or more resource elements forming the number of synchronization signal blocks where non-scheduling data has been scheduled for transmission in response to receiving the indication signifying at least one of the number of synchronization signal blocks or the location of each of the number of synchronization signal blocks; and receiving the non-scheduling data within the one or more resource elements forming the number of synchronization signal blocks.

11. The method of claim 10, wherein the indication corresponds to a downlink control information (DCI).

12. The method of claim 10, wherein the number of synchronization signal blocks is configured at a radio resource control (RRC) layer.

13. The method of claim 10, wherein the number of synchronization signal blocks corresponds to at least one of:
a single synchronization signal block,
two or more consecutive synchronization signal blocks, or
two or more non-consecutive synchronization signal blocks.

14. The method of claim 10, wherein the downlink channel corresponds to one of a physical downlink shared channel (PDSCH) or a physical downlink control channel (PDCCH).

15. A network entity, comprising:
a memory; and
at least one processor in communication with the memory and configured to:
identify a number of synchronization signal blocks available for transmission of non-scheduling data;
determine whether to transmit the non-scheduling data within the number of synchronization signal blocks;
schedule transmission of the non-scheduling data within one or more resource elements forming the number of synchronization signal blocks based on determining to transmit the non-scheduling data within the number of synchronization signal blocks;
configure an indication to signify the number of synchronization signal blocks; and
transmit, on a downlink channel, the indication signifying at least one of the number of synchronization signal blocks or a location of each of the number of synchronization signal blocks.

16. The network entity of claim 15, wherein the indication corresponds to downlink control information (DCI).

17. The network entity of claim 15, wherein the number of synchronization signal blocks is determined at a radio resource control (RRC) layer.

18. The network entity of claim 15, wherein the downlink channel corresponds to one of a physical downlink shared channel (PDSCH) or a physical downlink control channel (PDCCH).

19. The network entity of claim 15, wherein the number of synchronization signal blocks corresponds to at least one of:
a single synchronization signal block,
two or more consecutive synchronization signal blocks, or
two or more non-consecutive synchronization signal blocks.

20. The network entity of claim 15, wherein to determine at least one of the number of synchronization signal blocks or the location of each of the number of synchronization signal blocks, the at least one processor is further configured to determine that one or more resource elements forming the number of synchronization signal blocks are available for transmission.

21. The network entity of claim 15, wherein the at least one processor is further configured to transmit the non-scheduling data within the number of synchronization signal blocks following transmission of the indication signifying the number of synchronization signal blocks.

22. The network entity of claim 15, wherein each of the number of synchronization signal blocks is at least four symbols in length.

23. The network entity of claim 15, wherein the network entity corresponds to an gNodeB.

24. A user equipment, comprising:
a memory; and
at least one processor in communication with the memory and configured to:
receive, on a downlink channel, an indication signifying at least one of a number of synchronization signal blocks or a location of each of the number of synchronization signal blocks;
determine one or more resource elements forming the number of synchronization signal blocks where non-scheduling data has been scheduled for transmission in response to receiving the indication signifying at least one of the number of synchronization signal blocks or the location of each of the number of synchronization signal blocks; and
receive the non-scheduling data within the one or more resource elements forming the number of synchronization signal blocks.

25. The user equipment of claim 24, wherein the indication corresponds to a downlink control information (DCI).

26. The user equipment of claim 24, wherein the number of synchronization signal blocks is configured at a radio resource control (RRC) layer.

27. The user equipment of claim 24, wherein the number of synchronization signal blocks corresponds to at least one of:
a single synchronization signal block,
two or more consecutive synchronization signal blocks, or
two or more non-consecutive synchronization signal blocks.

28. The user equipment of claim 24, wherein the downlink channel corresponds to one of a physical downlink shared channel (PDSCH) or a physical downlink control channel (PDCCH).

* * * * *